(12) United States Patent
Choi et al.

(10) Patent No.: US 9,747,602 B2
(45) Date of Patent: Aug. 29, 2017

(54) METHOD OF REGISTERING ADVERTISEMENTS ON AN ELECTRONIC MAP

(75) Inventors: Jin Wan Choi, Gyeonggi-do (KR);
Kyungsung Shon, Gyeonggi-do (KR);
Joseph Kim, Seoul (KR); Choulwon Lee, Seoul (KR); Jaebong Kim, Gyeonggi-do (KR)

(73) Assignee: EXCALIBUR IP, LLC, Sunnyvale, CA (US)

( * ) Notice: Subject to any disclaimer, the term of this patent is extended or adjusted under 35 U.S.C. 154(b) by 2125 days.

(21) Appl. No.: 12/106,489

(22) Filed: Apr. 21, 2008

(65) Prior Publication Data
US 2009/0234736 A1 Sep. 17, 2009

(51) Int. Cl.
*G06Q 30/02* (2012.01)

(52) U.S. Cl.
CPC ......... *G06Q 30/02* (2013.01); *G06Q 30/0241* (2013.01)

(58) Field of Classification Search
CPC ...................................... G06Q 10/00
USPC .......................................... 705/14
See application file for complete search history.

(56) References Cited

U.S. PATENT DOCUMENTS

| 7,606,875 | B2 * | 10/2009 | Xie ...................... G06F 17/3087 709/218 |
| 8,249,930 | B2 * | 8/2012 | Badger .................. G06Q 30/02 705/14.4 |
| 2004/0103027 | A1 * | 5/2004 | Yamamoto et al. ............ 705/14 |
| 2009/0006194 | A1 * | 1/2009 | Sridharan .............. G06Q 30/02 705/14.62 |

(Continued)

FOREIGN PATENT DOCUMENTS

| JP | 2007199921 A | 8/2007 |
| JP | 2008-046987 | 2/2008 |

(Continued)

OTHER PUBLICATIONS

Preliminary Rejection for KR 10-2008-24319 and English Translation, Feb. 26, 2010.

(Continued)

*Primary Examiner* — Bruce I Ebersman
(74) *Attorney, Agent, or Firm* — Weaver Austin Villeneuve & Sampson LLP

(57) ABSTRACT

There is provided a method of registering advertisements for display on an electronic map through the use of an advertisement registration server. The advertisement registration server receives an access request from a terminal via the network. The server then searches a map information database for predetermined map information and transmits searched map information to the terminal. The predetermined map information is associated with center coordinates and a scale value. Further, the predetermined map information is structured into a lattice having a plurality of lattice units. From the terminal, the server receives an advertisement contents registration request having advertisement information identifying one or more of the plurality of lattice units. The server registers in an advertisement database the advertisement information in association with the one or more lattice units identified in the registration request, and the center coordinates and the scale value of the predetermined map information.

11 Claims, 9 Drawing Sheets

(56) References Cited

U.S. PATENT DOCUMENTS

2009/0198607 A1* 8/2009 Badger ................ G06Q 30/02
705/37

FOREIGN PATENT DOCUMENTS

| JP | 2008046987 A | 2/2008 |
|----|--------------|--------|
| KR | 10-2000-0023936 | 5/2000 |
| KR | 10-2008-0051442 | 6/2008 |
| KR | 2008-0078302 | 8/2008 |

OTHER PUBLICATIONS

International Preliminary Report on Patentability dated Mar. 24, 2011, Application No. PCT/US2009/055235.
International Search Report and Written Opinion of the International Searching Authority dated Mar. 30, 2010, PCT Application No. PCT/US2009/055235.
Korean Office Action dated Jun. 8, 2010, Application No. 2008-89873.
US Office Action dated Mar. 21, 2011, U.S. Appl. No. 12/233,412.

* cited by examiner

METHOD OF REGISTERING ADVERTISEMENTS ON AN ELECTRONIC MAP

RELATED APPLICATIONS

This application claims priority from Republic of Korea Patent Application No. 10-2008-24319, filed Mar. 17, 2008.

TECHNICAL FIELD

The present disclosure generally relates to a method of registering and displaying advertisements on an electronic map provided from a server via the Internet network, and more particularly to a method of registering and displaying advertisements in a particular lattice unit area of the electronic map.

BACKGROUND

With the development and wide spread use of the Internet, advertising using the Internet is being spotlighted as a new advertising means. Advertising using the Internet includes providing advertisements through the enterprises' homepages, providing advertisements in the form of banners on web sites, and displaying advertisements on a specific location of an electronic map based on the Geographic Information System (GIS).

The GIS is a system that collects, stores, analyzes and processes geographical data for application to geographic-related fields (e.g., roads, traffics, telecommunication, gas, water pipes, water resources, forest resources, geological soils, etc.). An electronic map refers to a map that is provided by collecting and processing ground data regarding roads and facilities, and digitally transforming the data. An electronic map may be implemented by software configured to transform paper maps made through measurement into digital data. Alternatively, the electronic map may be created by digital information obtained from GPS receivers or satellite pictures. Typically, for the electronic maps to be provided through the Internet, map information should be hierarchically organized according to their scales for storage in an electronic map database. For example, map information may be organized such that a higher level of map information having higher scales is hierarchically linked to a lower level of map information having lower scales. Such an organization of map information may allow a suitable level of map information to be provided and displayed on a user's terminal in response to the user's requests.

Advertisers may provide their advertisements to consumers with location information by registering and displaying advertisements on a predetermined location of an electronic map provided through the Internet. The advertisement contents, which are displayed on the predetermined location of the electronic map, may include, for example, text advertisements of building name/firm name, images or symbol advertisements, animation advertisements such as animation GIF or Flash, voice advertisements, moving picture advertisements, and URL information that allows advertisers to move to a website.

The advertisements, which consist of texts only, are not overlapped on the electronic map since the text advertisements are disclosed sequentially. The advertisements consisting of images or the like may be overlapped depending on the size and location of the advertisements. In other words, if an advertisement is registered in a predetermined location of an electronic map and other advertisements are also registered in such predetermined or close locations, the advertisements may be overlapped with each other. Thus, the effect of advertisements may decrease.

SUMMARY

In accordance with an embodiment of the present invention, there is provided a method of registering advertisements for displaying on an electronic map using an advertisement registration server. The advertisement registration server receives an access request from a terminal via a communication network. Then, the server searches a map information database for predetermined map information and transmits the searched map information to the terminal in response to the receipt of the access request. The predetermined map information is associated with center coordinates and a scale value, and structured into a lattice having a plurality of lattice units. The advertisement registration server receives from the terminal an advertisement contents registration request having advertisement information identifying one or more of the plurality of lattice units. In an advertisement database, the advertisement registration server registers the advertisement information in association with the one or more lattice units identified in the registration request, and center coordinates and the scale value of the predetermined map information. In some implementations, the invention provides a method of preventing advertisements from overlapping with each other by dividing an electronic map into a plurality of lattice units and registering each of the advertisements in the respective lattice unit of the electronic map.

In accordance with an embodiment of the present invention, the advertisement information includes information associated with the one ore more of plurality of the lattice units and advertisement content. In accordance with an embodiment of the present invention, the method further comprises transmitting information notifying that an advertisement has already registered in one or more of the lattice units to one or more terminals that access the advertisement registration server. In accordance with an embodiment of the present invention, the information notifying that an advertisement has already registered is based on the advertisement information registered in the advertisement server. In accordance with an embodiment of the present invention, receiving an access request of the terminal via a network further comprises authorizing the terminal. In accordance with an embodiment of the present invention, the method further comprises searching the map information database for the predetermined map information whose scale value is one-level upper or lower and transmitting the searched map information to the terminal, if an input that enlarges or reduces the electronic map is received from the terminal. In accordance with an embodiment of the present invention, only one advertisement content can be registered in each of the plurality of lattice units. In accordance with an embodiment of the present invention, a plurality of advertisement contents can be registered in each of the plurality of lattice units. In accordance with an embodiment of the present invention, the plurality of advertisement contents is displayed on the electronic map in a random rolling form. In accordance with an embodiment of the present invention, the plurality of lattice units is equal-sized. In accordance with an embodiment of the present invention, the terminal is one of a computer, mobile communication terminal, internet set top box or PDA. In accordance with an embodiment of the present invention, the advertisement content is one of a text, symbol, image, moving picture, animation, URL or combination thereof.

DESCRIPTION OF EXAMPLE EMBODIMENTS

Various embodiments of the present invention will be described below in detail with reference to the accompanying drawings. It will be apparent, however, that these embodiments may be practiced without some or all of these specific details. In other instances, well-known process steps or elements have not been described in detail so as not to unnecessarily obscure the description of the invention. According to a particular implementation of the present invention, an electronic map divided into a plurality of lattice units is provided to an advertiser. The lattice units may be marked differently depending on whether advertisement contents are registered in the corresponding lattice units or not. The advertiser may purchase one or more lattice units that have not been already registered. Accordingly, the advertisement contents may be displayed on the electronic map without overlapping. According to the present invention, whether each lattice unit can be purchased by advertisers or not is updated and represented on the electronic map in real-time. This prevents different advertisers from purchasing the same lattice unit.

Figure 1:
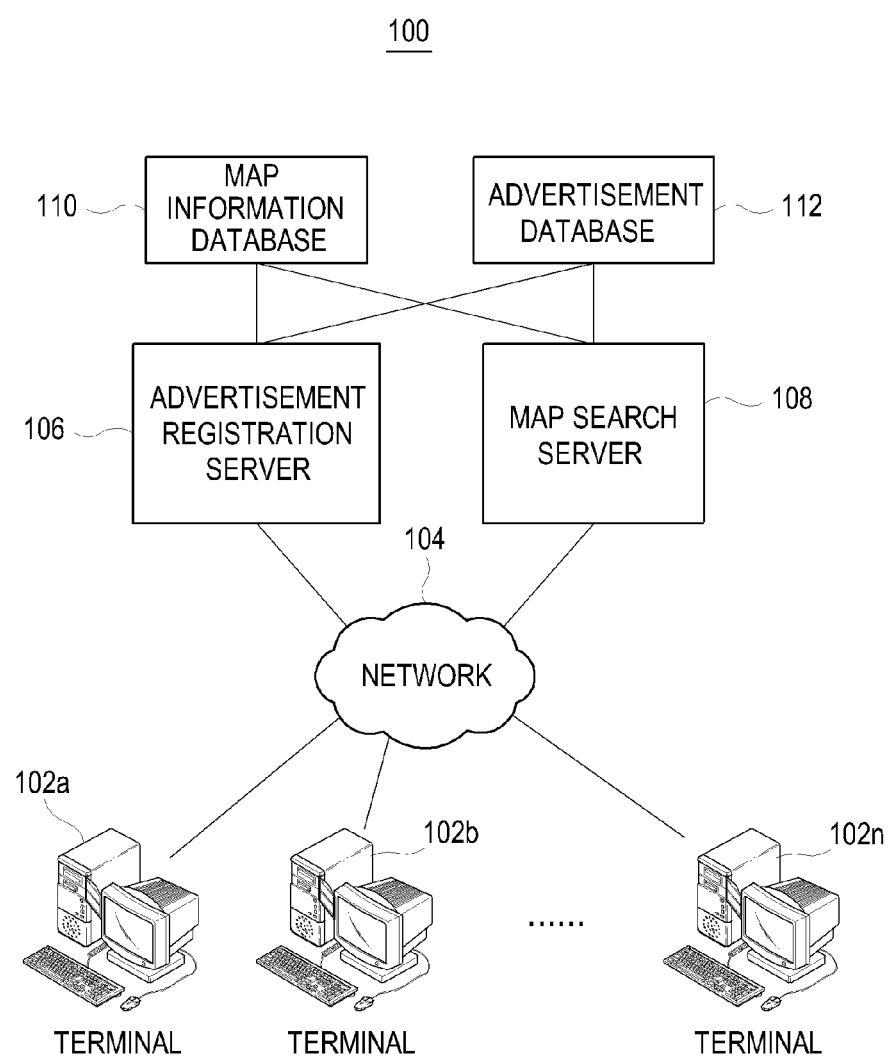
FIG. 1 illustrates a map advertising system in accordance with an embodiment of the present invention.

FIG. 1 illustrates a map advertising system in accordance with an embodiment of the present invention. Referring to FIG. 1, a map advertising system 100 may include a plurality of terminals 102a-102n. The plurality of terminals 102a-102b used by advertisers or users may include, for example, computers, mobile communication terminals, Internet set top boxes, PDAs, etc. However, they are not limited thereto. Each of the terminals may be operable to display map information and advertisements on its monitor, and may be used as a user interface device for receiving requests from advertisers or users.

The plurality of terminals 102a-102n may be connected to an advertisement registration server 106 and a map search server 108 via a network 104. The network 104 may be wired or wireless Internet network.

The advertisement registration server 106 may be operable to receive an access request from an advertiser via the network 104, search a map information database 110 for map information, and transmit the searched map information to the advertiser via the network 104. The advertisement registration server 106 may also be operable to receive a lattice unit purchasing input from the advertiser via the network 104. In response to the input, the advertisement registration server 106 may be operable to store in an advertisement database 112 advertisement information (including, for example, advertisement contents and the location of the lattice unit on an electronic map where the advertisement contents are displayed). In such a case, the advertisement information may be stored in association with the relevant map information (for example, center coordinates and scale value of the electronic map).

The map search server 108 may be operable to receive an access request from a user via the network 104, search the map information database 110 and an advertisement database 112 for information, and transmit the searched information to the user via the network 104. The transmitted information may be transformed into the form of an electronic map by a map application for display on a user's terminal. The map search server 108 may further be operable to collect the frequency of each of advertisement contents being exposed to users.

The map information database 110 may be operable to store map information regarding various scale-levels of electronic maps. According to an embodiment of the present invention, map information stored in the map information database 110 may be categorized into a total of 16 levels of scale. According to another embodiment of the present invention, map information may be categorized into more than or less than 16 levels of scale. The map information stored in the map information database 110 may be identified by center coordinates and scale value of an electronic map. Although the advertisement registration server 106 and map search server 108 are illustrated as separate devices, it will be apparent to those skilled in the art that those servers may be implemented as either one device or more than two devices.

Figure 2:
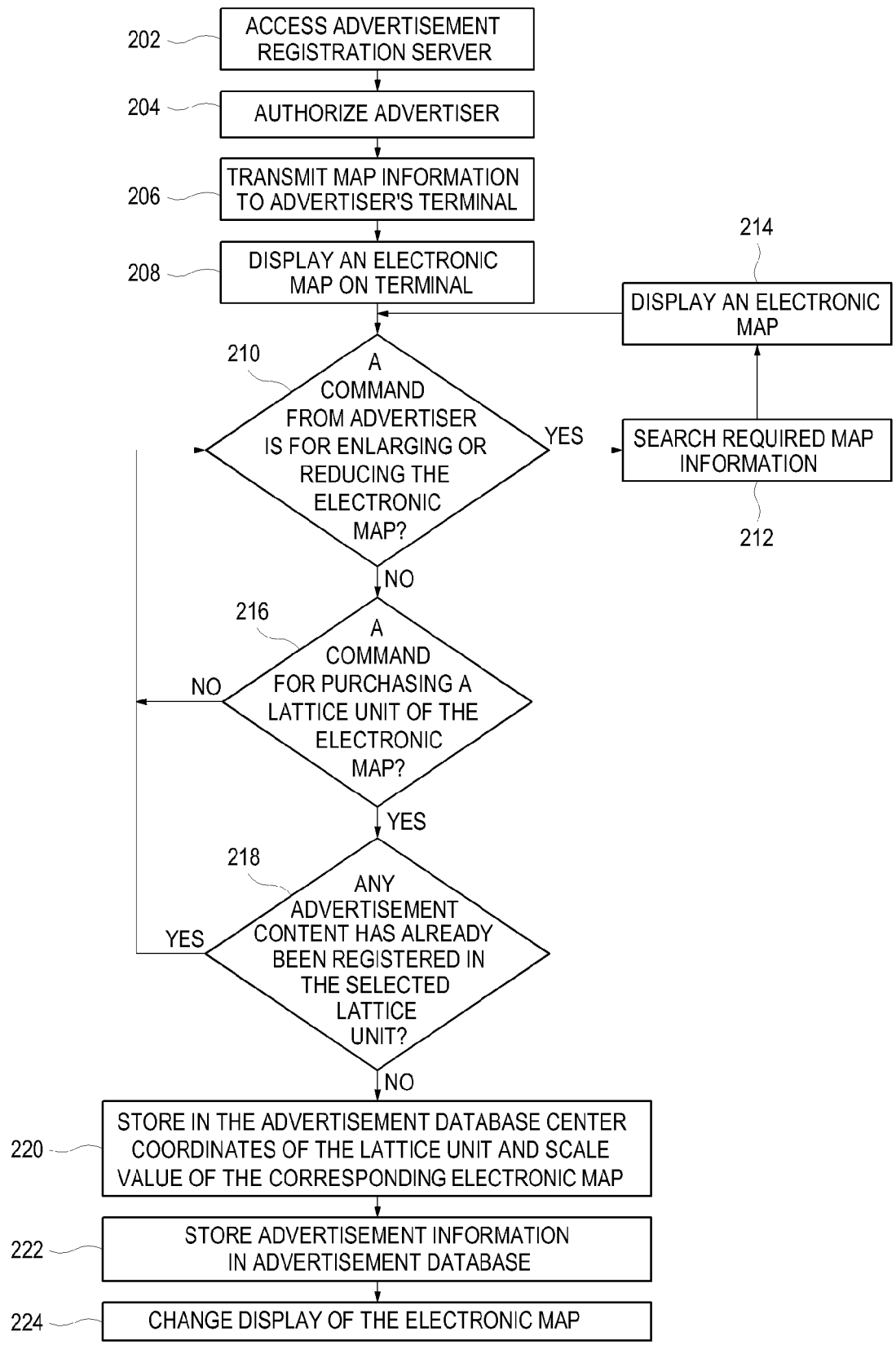
FIG. 2 shows a flow chart for registering advertisements in accordance with an embodiment of the present invention.

FIG. 2 shows a flow chart for registering advertisements in accordance with an embodiment of the present invention.

In block 202, the advertiser's terminal accesses the advertisement registration server 106 via the network 104. Then, the advertisement registration server 106 performs pre-defined authorization of the advertiser's access (block 204). After authorization, the advertisement registration server 106 searches the map information database 110 for map information and transmits the searched map information to the advertiser's terminal (block 206). According to an embodiment of the present invention, predetermined map information (e.g., world map information) may be transmitted to an advertiser in response to the advertiser's terminal accessing the advertisement registration server 106. According to another embodiment of the present invention, map information of certain area pre-stored by an advertiser may be transmitted to the advertiser.

The map information transmitted to the advertiser's terminal is transformed into the form of an electronic map and displayed on the advertiser's terminal (block 208). The electronic map as displayed may include topography, roads, buildings, rivers, etc. The electronic map may be partitioned into a plurality of lattice units with a plurality of equally-spaced column and row lines. According to an embodiment of the present invention, the plurality of lattice units may be equal-sized. According to another embodiment of the present invention, the size of the lattice units may vary according to various scale-levels of electronic maps stored in the map information database 110.

The plurality of lattice units may be displayed differently depending on whether advertisement contents are registered in the corresponding lattice units or not. According to an embodiment of the present invention, one group of lattice units with registered advertisement contents and the other group of lattice units without registered advertisement contents may be displayed in different colors so that advertisers can distinguish these two groups. According to another embodiment of the present invention, the registered advertisement contents themselves may be displayed in lattice units so that advertisers can distinguish these lattice units from lattice units without registered advertisement contents. It will be apparent to those skilled in the art that different methods of displaying lattice units (including methods of displaying with different patterns or symbols or adjusting the brightness, chromaticity, opacity, etc.) may be used. By displaying the plurality of lattice units differently, advertisers may easily discern the lattice units without any registered advertisement content.

The embodiments shown in FIG. 2 have been described with the assumption that only one advertisement content can be registered in one lattice unit and additional advertisement contents cannot be registered in the lattice unit where the advertisement content is already registered. However, it should be noted that the present invention is not limited thereto. According to another embodiment of the present invention, a predetermined number of advertisement contents may be registered in one lattice unit. In another embodiment, each lattice unit has associated therewith a plurality of advertisement types (such as restaurant, retail store, etc.), to which a predetermined number of advertisements can be registered. The plurality of advertisement contents may be registered to be displayed in a random rolling form. The lattice units of an electronic map are divided into two groups; one group allowing additional registration of advertisement contents and the other group disallowing additional registration. According to an embodiment of the present invention, two groups may be displayed differently by using different colors, patterns or symbols, or by adjusting the brightness, chromaticity, opacity, etc. According to another embodiment of the present invention, if an advertiser clicks a lattice unit, then the registration status of the lattice unit may be displayed in a location below or near the electronic map.

After the electronic map is displayed on the advertiser's terminal in block 208, the advertisement registration server 106 receives an input from the advertiser. The advertisement registration server 106 determines whether the input is for enlarging or reducing the electronic map (block 210). In block 210, if the input is for enlarging or reducing the electronic map, then the advertisement registration server 106 searches the map information database 110 for the required map information in response to the input (block 212). Then, in block 212, the searched map information is transmitted to the advertiser's terminal. The advertiser's terminal displays corresponding electronic map on its monitor by transforming transmitted map information. The process then returns to block 210.

According to an embodiment of the present invention, a process of enlarging an electronic map is illustrated in FIGS. 3 to 6.

Figure 3:
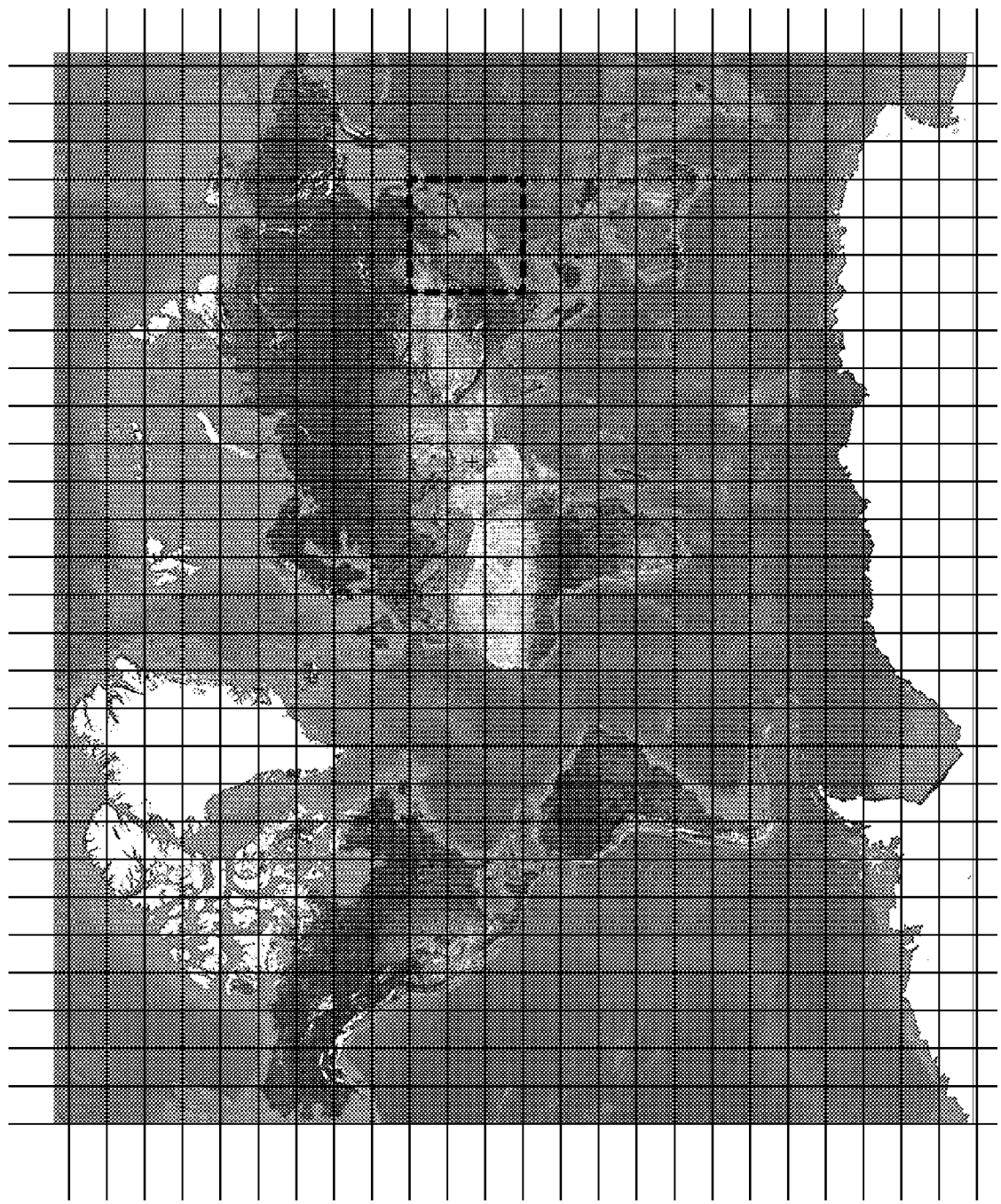
FIGS. 3 to 6 illustrate a process of enlarging electronic maps, which are divided into a plurality of lattice units, on a user's terminal at an advertiser's request in accordance with an embodiment of the present invention.
Figure 4:
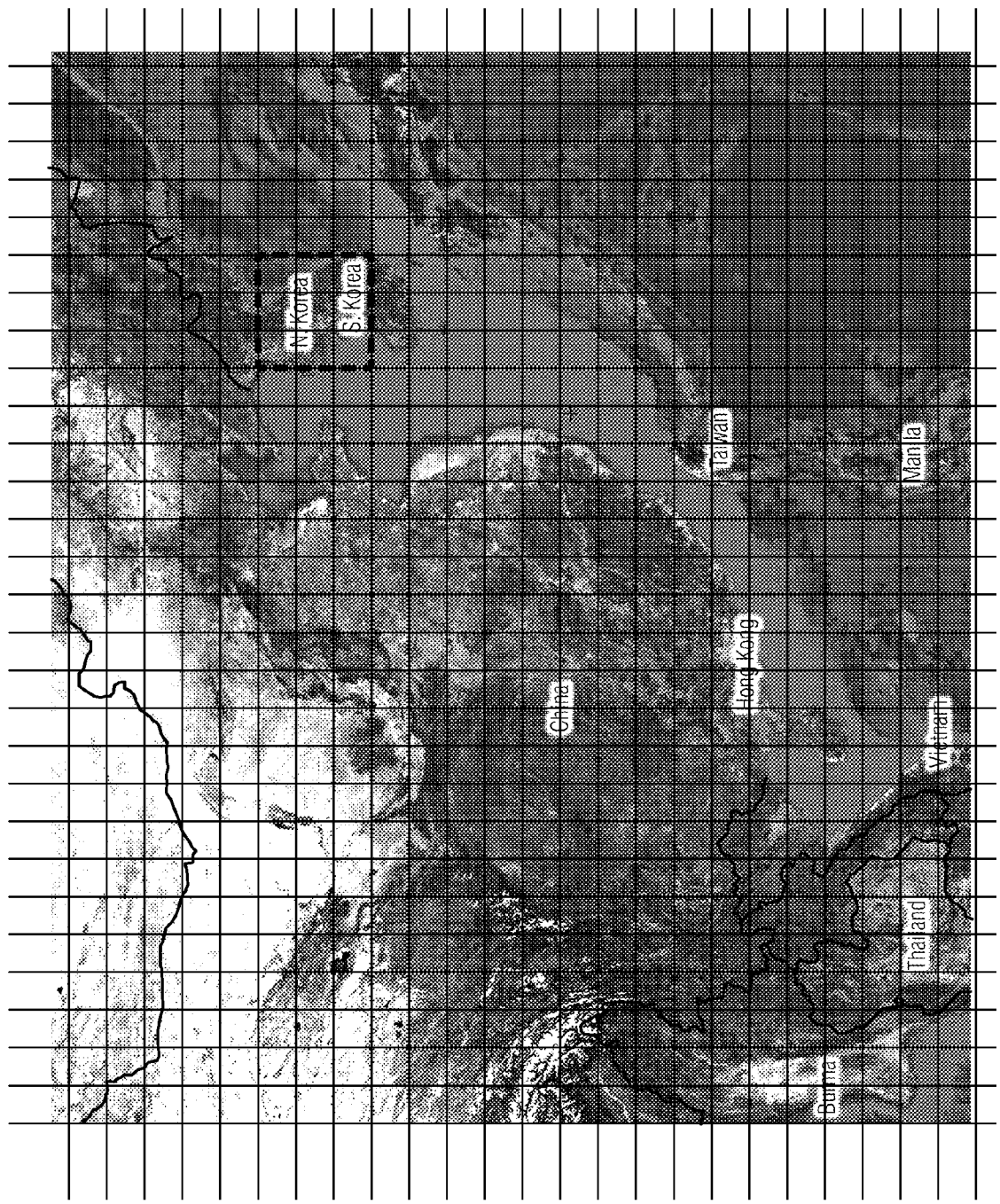
Figure 5:
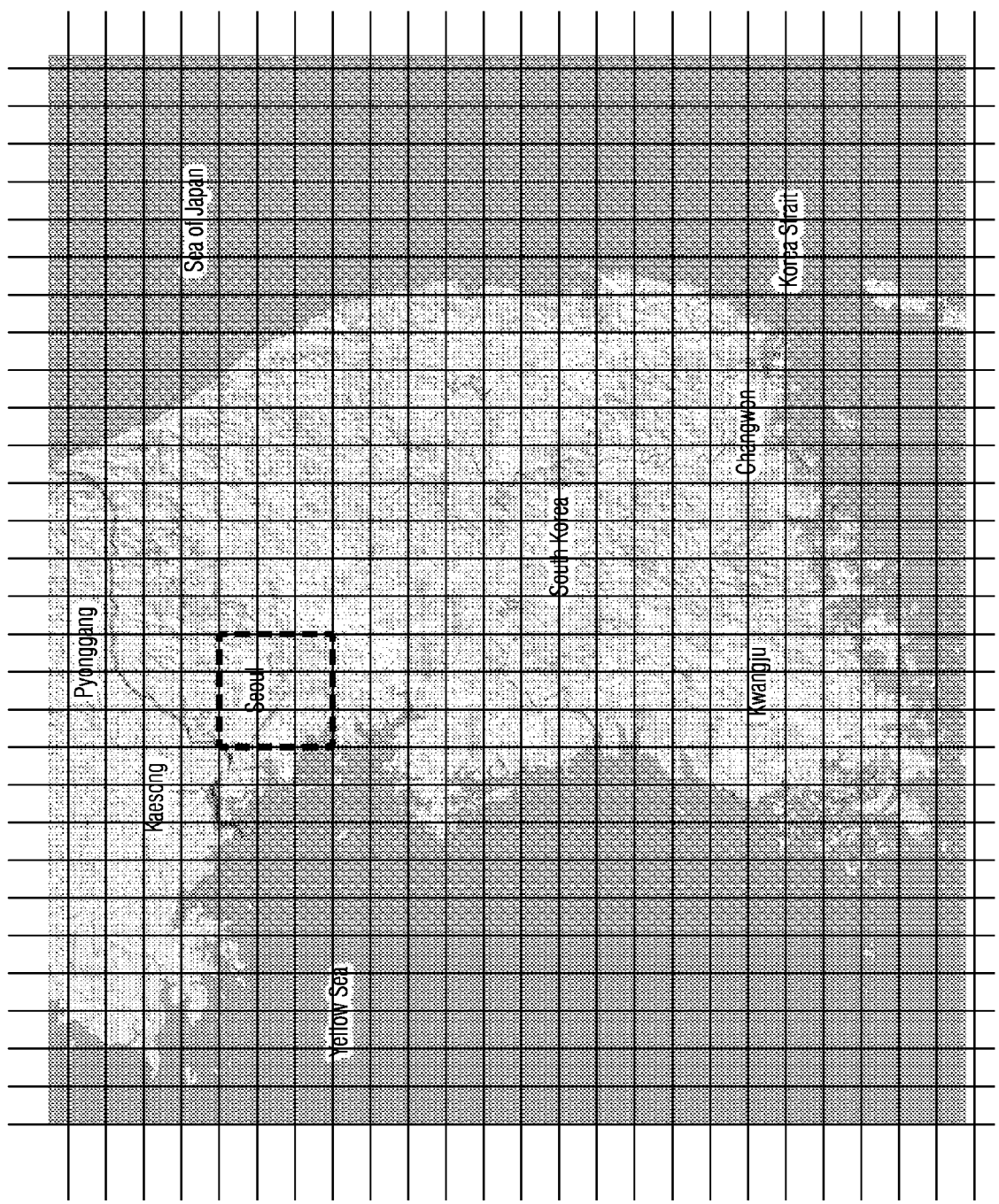
Figure 6:
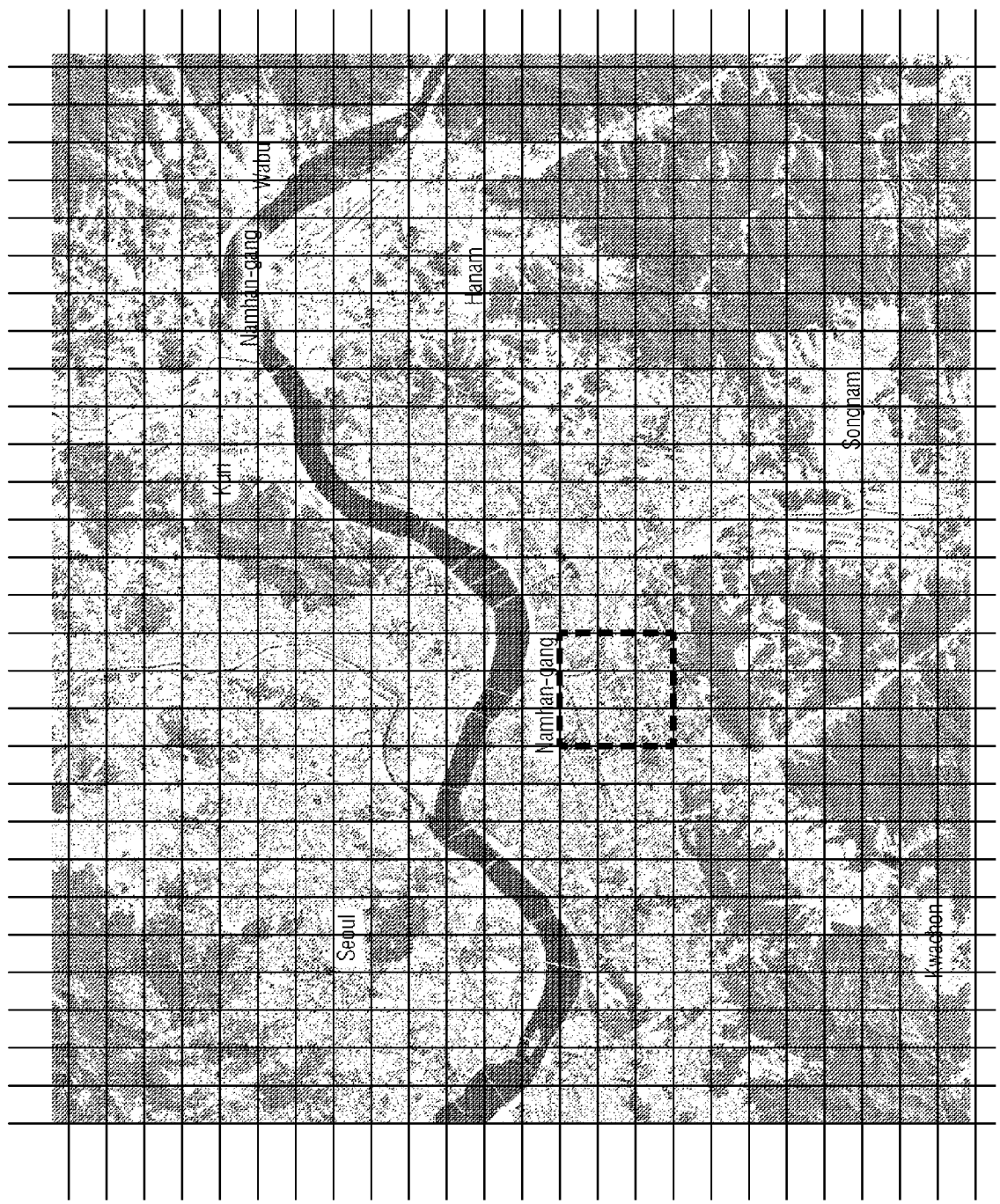

The world map structured into a plurality of lattice units is illustrated in FIG. 3. An advertiser may select one of the lattice units in order to enlarge a certain area. According to an embodiment of the present invention, if the advertiser selects one of the lattice units, then the selected lattice unit and its surrounding 8 lattice units are enlarged to display one scale-level lower electronic map. According to another embodiment of the present invention, more than or less than 9 lattice units may be enlarged to display one scale-level lower electronic map. As illustrated in FIGS. 4 to 6, the electronic map may be enlarged sequentially to display more detailed geographical information.

According to an embodiment of the present invention, if the advertiser selects one lattice unit in order to enlarge the electronic map, then the center coordinates of the lattice unit and scale value of the corresponding electronic map (e.g., 1:1,000,000) are transmitted to the advertisement registration server 106. The advertisement registration server 106 searches the map information database 110 for map information of the electronic map whose scale value is one-level lower (e.g., 1:200,000) than the transmitted scale value and whose center coordinates correspond to the transmitted center coordinates. Then, the advertisement registration server 106 transmits the searched map information to the advertiser's terminal via the network 104.

Referring back to FIG. 2, if the input is not for enlarging or reducing the electronic map (block 210), then the advertisement registration server 106 determines whether the input is for purchasing one or more lattice units of the electronic map (block 216). If the input is for purchasing one or more lattice units of the electronic map, then the center coordinates of the lattice units and the scale value of the corresponding electronic map are transmitted to the advertisement registration server 106 via the network 104. In block 216, if the input is not for purchasing, then the process returns to block 210 to wait for a new input from the advertiser.

After the center coordinates and scale value are transmitted to the advertisement registration server 106 in block 216, the advertisement registration server 106 determines whether one or more lattice units are purchasable, i.e., whether any advertisement content has already been registered in one or more lattice units (block 218). If any advertisement content has already been registered in one or more lattice units, then the advertiser's purchasing input is regarded as failed input and the process returns to block 210. According to another embodiment of the present invention where a predetermined number of advertisement contents can be registered for each lattice unit, the advertiser's purchasing input is regarded as failed input only when the predetermined number of advertisement contents have already been registered in each lattice unit.

If any advertisement is not registered in one or more lattice units, then the advertisement registration server 106 stores in the advertisement database 112 the center coordinates of one or more lattice units and the scale value of corresponding electronic map (block 220). Then, the advertisement registration server 106 receives one or more advertisement contents from the advertiser's terminal, which are to be displayed on one or more lattice units, and stores the received advertisement contents in the advertisement database 112 (block 222). According to an embodiment of the present invention, the advertiser's advertisement contents may be pre-stored in the advertisement database 112.

In block 222, each of the advertisement contents is adjusted to fit the area occupied by one or more lattice units and stored in the advertisement database 112. Thus, the advertisement contents may be displayed without overlapping on the advertisers' terminals accessing the advertisement registration server 106 or the map search server 108.

After block 222, the display of the electronic map is changed by using the advertisement information stored in the advertisement database 112 (block 224). For example, the indication notifying that one or more lattice units on the electronic map have already been purchased may be displayed on the electronic map by changing the color, brightness or chromaticity of one or more lattice units. According to another embodiment of the present invention where a predetermined number of the advertisement contents can be registered in the respective lattice unit, it is determined whether the predetermined number of advertisement contents has been registered in the lattice unit. If the predetermined number of advertisement contents has been registered, then the corresponding lattice unit may be displayed differently. As such, this prevents subsequent advertisers from registering an advertisement in the already purchased lattice unit.

Figure 7:
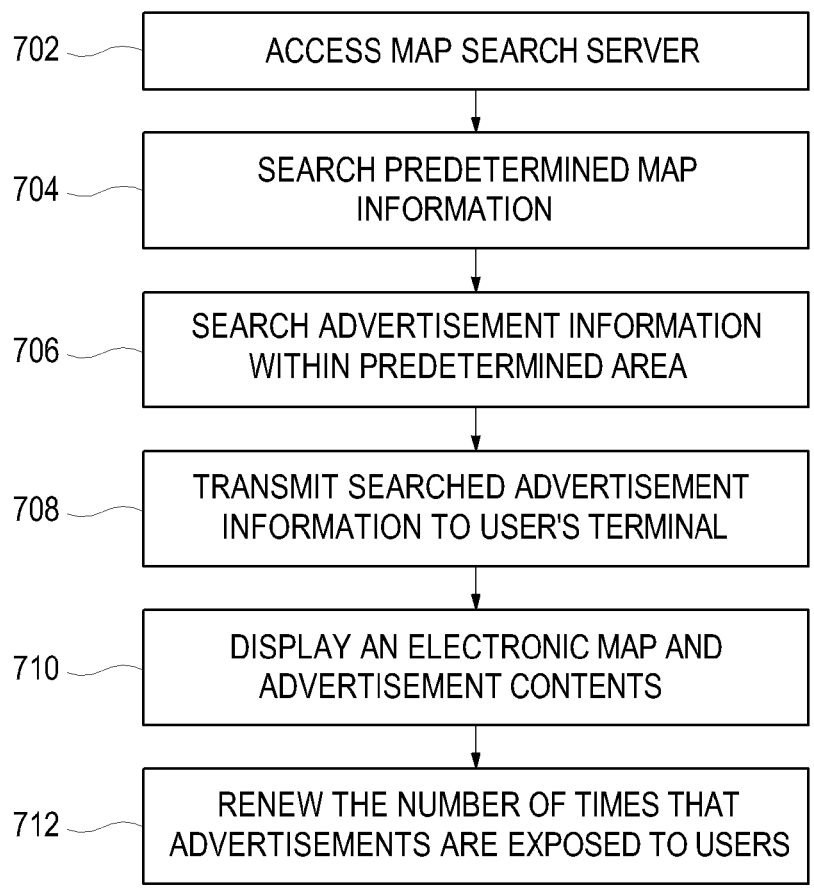
FIG. 7 shows a flow chart for displaying an electronic map with advertisement contents on a user's terminal in accordance with an embodiment of the present invention.

FIG. 7 shows a flow chart for displaying an electronic map with advertisement contents on a user terminal in accordance with an embodiment of the present invention.

The user terminal accesses the map search server 108 via the network 104 (block 702). Upon being accessed by the user terminal, the map search server 108 searches the map information database 110 for predetermined map information and transmits the searched map information to the user terminal via the network (block 704). The map search server 108 then searches the advertisement database 112 for advertisement information having advertisement contents located within the predetermined distance from the center coordinates of the searched map information (block 706). The map search server 108 transmits certain advertisement information only (i.e., only advertisement information whose advertisement contents are located within certain area). Thus, the system may operate faster. In addition, the advertisements are displayed in the center portion of a display so that the advertising effect may be improved.

The map search server 108 transmits the searched advertisement information to corresponding user terminal via the network 104 (block 708). The user terminal displays an electronic map and advertisement contacts on the appropriate location thereof by transforming the transmitted map information and advertisement information into suitable forms (block 710).

Figure 8:
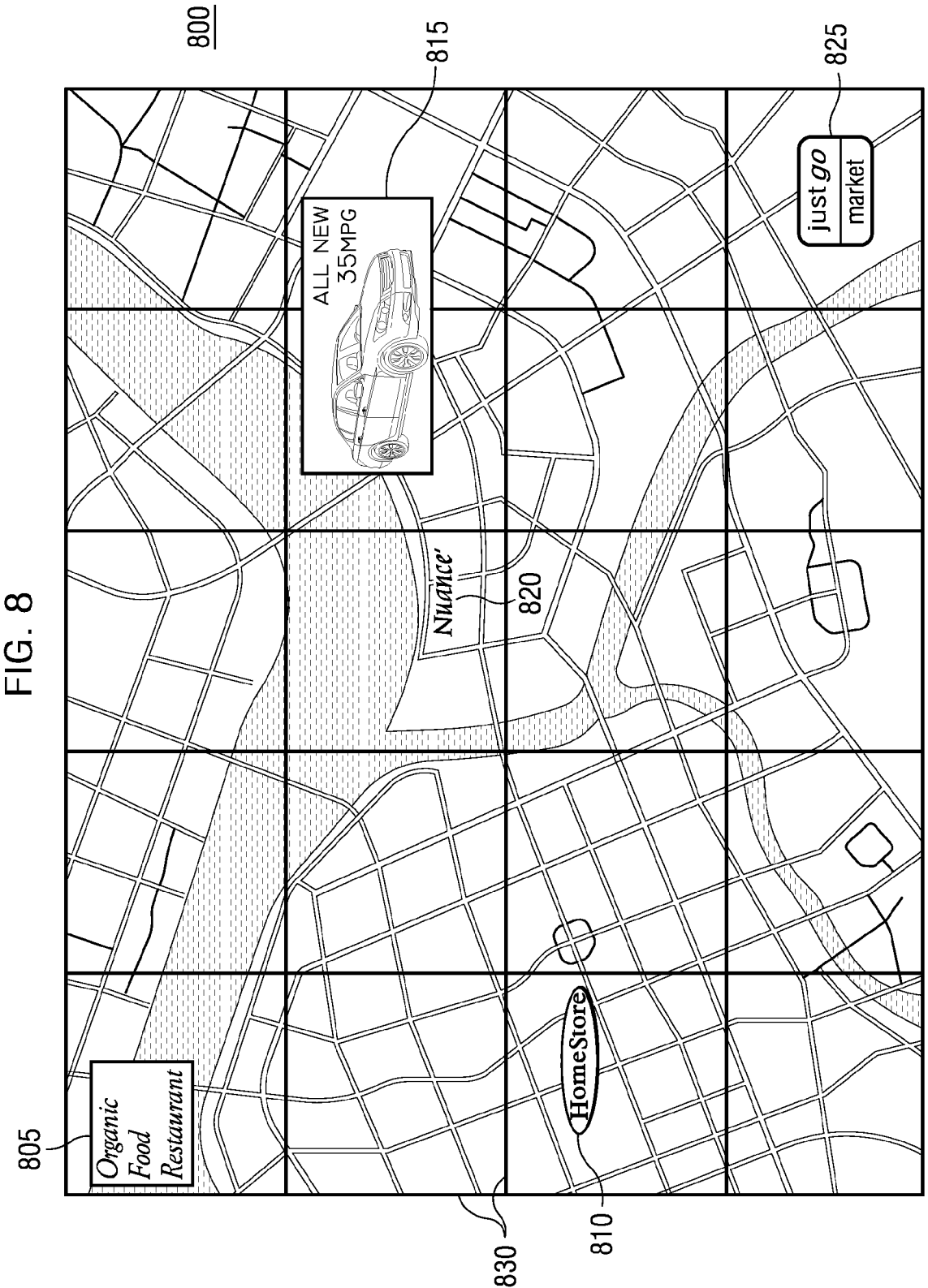
FIG. 8 illustrates an electronic map with a plurality of advertisement contents displayed on the user terminal

FIG. 8 illustrates an electronic map 800 together with a plurality of advertisement contents displayed on the user terminal. As shown in FIG. 8, the electronic map 800 includes a plurality of lattice units partitioned with a plurality of equally-spaced column and row lines 830. Although the column and row lines 830 are shown for illustrative purposes, they may not be displayed on the user terminal according to an embodiment of the invention. A total of five advertisement contents 805, 810, 815, 820 and 825 are displayed on the electronic map 800. According to an embodiment of the present invention, each of the advertisement contents may be one of the following: a text, symbol, image, moving picture, animation, URL or combination thereof. As shown in FIG. 8, each of the advertisement contents 805, 810, 815, 820 and 825 is displayed within the corresponding lattice unit area that was purchased in the course of registering an advertisement content as discussed in conjunction with FIG. 2. The corresponding lattice unit area may include one or more lattice units. In the embodiment shown, each of the advertisement contents 805, 810, 820 and 825 is displayed within one lattice unit, while the advertisement content 815 is displayed within two lattice units. According to another embodiment of the present invention where a predetermined number of advertisement contents can be registered for each lattice unit, the advertisement contents can be displayed in a random rolling form within the corresponding lattice unit (not shown in FIG. 8).

These advertisement contents 805, 810, 815, 820 and 825 are displayed without overlapping with each other. Thus, the advertisement content can be displayed more effectively on the electronic map. In addition, when two or more lattice units were purchased in the course of registering an advertisement content, the advertisement content can be displayed in a larger size within the corresponding two or more lattice units so that advertisement effects may be increased.

Referring to FIG. 7 again, the map search server 108 then renews the number of times that each of the advertisement contents is exposed to the users (block 712). According to an embodiment of the present invention, the map search server 108 may store the number of times that the user clicks the corresponding advertisement contents. The stored information is provided to the advertiser for advertisement statistics.

Figure 9:
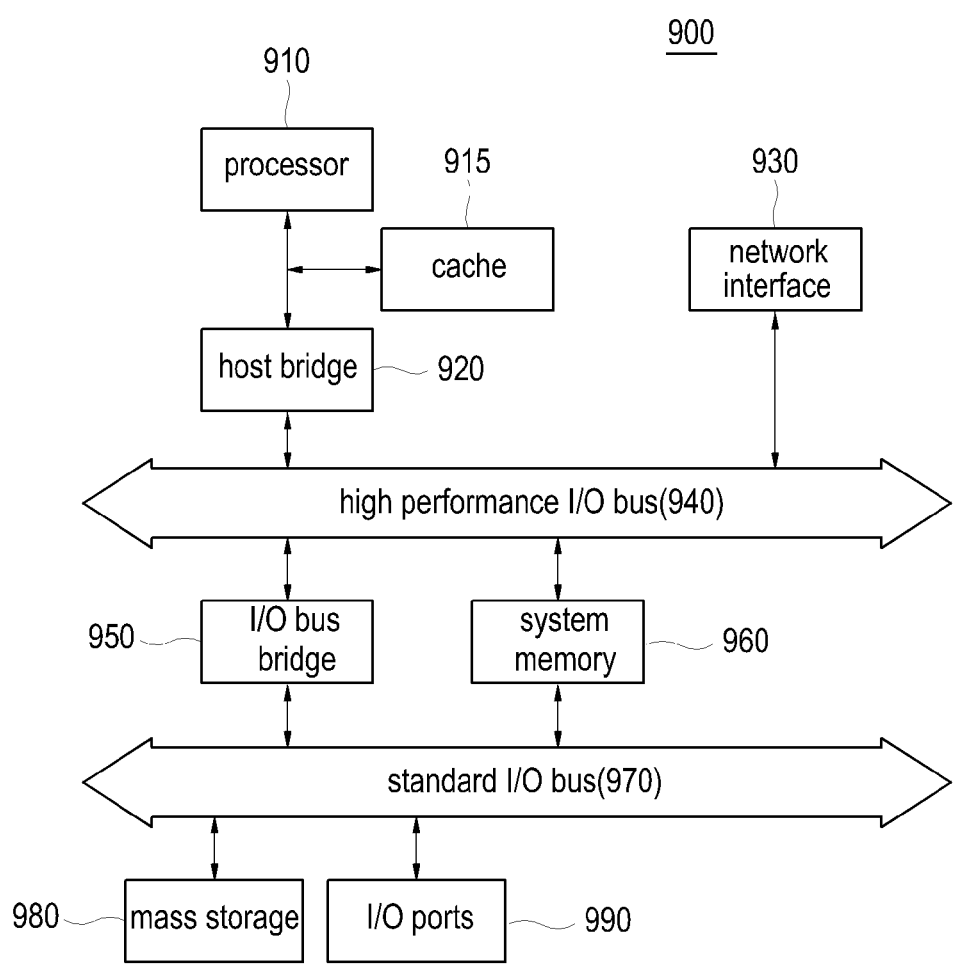
FIG. 9 illustrates a computing system architecture, which may be used to implement a server according to an embodiment of the present invention.

While the methods of the present invention have been described above with reference to specific embodiments, some or all of the elements or operations thereof may be implemented using a computer system having a general purpose hardware architecture. FIG. 9 illustrates an example computing system architecture, which may be used to implement one or more of the operations described herein. In one implementation, hardware system 900 comprises a processor 910, a cache memory 915, and one or more software applications and drivers directed to the functions described herein.

Additionally, hardware system 900 includes a high performance input/output (I/O) bus 940 and a standard I/O bus 970. A host bridge 920 couples processor 910 to high performance I/O bus 940, whereas I/O bus bridge 950 couples the two buses 940 and 970 to each other. A system memory 960 and a network/communication interface 930 are coupled to bus 940. Hardware system 900 may further include video memory (not shown) and a display device coupled to the video memory. Mass storage 930 and I/O ports 990 are coupled to bus 970. Hardware system 900 may optionally include a keyboard and pointing device, and a display device (not shown) coupled to bus 970. Collectively, these elements are intended to represent a broad category of computer hardware systems including, but not limited to, general purpose computer systems based on the Pentium® processor manufactured by Intel Corporation of Santa Clara, Calif., as well as any other suitable processor.

The elements of hardware system 900 are described in greater detail below. In particular, network interface 930 provides communication between hardware system 900 and any of a wide range of networks, such as an Ethernet (e.g., IEEE 802.3) network, etc. In the case of the map advertisement system 100, the network interface 930 interfaces between the hardware system 900 and the network for allowing the hardware system 900 to manage those databases. Mass storage 930 provides permanent storage for the data and programming instructions to perform the above described functions implemented in the map advertisement system 100, whereas a system memory 960 (e.g., DRAM) provides temporary storage for the data and programming instructions when executed by processor 910. I/O ports 990 are one or more serial and/or parallel communication ports that provide communication between additional peripheral devices, which may be coupled to hardware system 900.

Hardware system 900 may include a variety of system architectures and various components of hardware system 900 may be rearranged. For example, cache 915 may be on-chip with processor 910. Alternatively, cache 915 and processor 910 may be packed together as a "processor module," with processor 910 being referred to as the "processor core." Furthermore, certain implementations of the present invention may not require or include all of the above components. For example, the peripheral devices shown coupled to standard I/O bus 970 may couple to high performance I/O bus 940. In addition, in some implementations only a single bus may exist, with the components of hardware system 900 being coupled to the single bus. Furthermore, hardware system 900 may include additional components such as additional processors, storage devices or memories. As discussed below, in an embodiment, the operations of the integrated search system described herein are implemented as a series of software routines run by hardware system 900. These software routines comprise a plurality or series of instructions to be executed by a processor in a hardware system such as processor 910. Initially, the series of instructions are stored on a storage device such as mass storage 930. However, the series of instructions can be stored on any suitable storage medium such as a diskette, CD-ROM, ROM, EEPROM, etc. Furthermore, the series of instructions need not be stored locally and could be received from a remote storage device, such as a server on a network, via network/communication interface 930. The instructions are copied from the storage device, such as mass storage 930, into memory 960 and then accessed and executed by processor 910.

An operating system manages and controls the operation of hardware system 900, including the input and output of data to and from software applications (not shown). The operating system provides an interface between the software applications being executed on the system and the hardware components of the system. According to an embodiment of the present invention, the operating system is the Windows® 95/98/NT/XP operating system, which is available from Microsoft Corporation of Redmond, Wash. However, the present invention may be used with other suitable operating systems such as the Apple Macintosh Operating System, which is available from Apple Computer Inc. of Cupertino, Calif., UNIX operating systems, LINUX operating systems and the like.

Further, while the present invention has been shown and described with respect to a preferred embodiment, those skilled in the art will recognize that various changes and modifications may be made without departing from the spirit and scope of the invention as defined in the appended claims.

What is claimed is:

1. A method of registering advertisements for displaying on an electronic map at an advertisement registration server, comprising:

receiving an access request from a terminal via a communication network, wherein the terminal is one of a computer, a mobile communication device, an internet set top box, or a personal digital assistant;

searching a map information database for first map information and transmitting at least some of the first map information to the terminal via the communication network in response to the access request, said first map information being associated with first center coordinates and a first scale value and structured into a first lattice having a plurality of first lattice units, a first subset of the first lattice units being designated as allowing additional advertisement registration, a second subset of the first lattice units being designated as disallowing additional advertisement registration;

receiving map scaling input from the terminal via the communication network, the map scaling input representing a modification of the first scale value to a second scale value, the second scale value being different than the first scale value and representing a more detailed representation of the electronic map;

searching the map information database for second map information and transmitting at least some of the second map information to the terminal via the communication network in response to the map scaling input, said second map information being associated with second center coordinates and the second scale value and structured into a second lattice having a plurality of second lattice units, a first subset of the second lattice units being designated as allowing additional advertisement registration, a second subset of the second lattice units being designated as disallowing additional advertisement registration, wherein more than one of the second lattice units corresponds geographically to one of the first lattice units, and whether additional advertisement registration is allowed for at least one of the second lattice units is independent of whether additional advertisement registration is allowed for the first lattice unit to which the at least one of the second lattice units corresponds;

receiving an advertisement content registration request from the terminal via the communication network, said advertisement content registration request having advertisement information identifying one or more of the first and second lattice units for which additional advertisement registration is allowed, the advertisement information including advertisement content, wherein the advertisement content is one of text, a symbol, an image, a moving picture, an animation, uniform resource locator (URL), or a combination thereof; and registering in an advertisement database the advertisement information in association with the one or more of the first and second lattice units identified in the advertisement content registration request such that the advertisement content corresponding to the registered advertisement information does not visually overlap with other advertisement content having associated advertisement information registered in the advertisement database when displayed in a graphical user interface in accordance with either of the first or second scale values on a client device operating in the communication network.

2. The method of claim 1, further comprising:

transmitting information notifying that an advertisement has already been registered in the one or more of the first and second lattice units to one or more other terminals that access the advertisement registration server.

3. The method of claim 2, wherein the information notifying that an advertisement has already been registered is based on the advertisement information registered in the advertisement server.

4. The method of claim 1, wherein receiving the access request of the terminal via network further comprises authorizing the terminal.

5. The method of claim 1, wherein only one advertisement is registered in each of the lattice units.

6. The method of claim 1, wherein a plurality of advertisements is registered in each of the lattice units.

7. The method of claim 6, wherein the plurality of advertisements is displayed on the electronic map in a random rolling form.

8. The method of claim 1, wherein the plurality of lattice units corresponding to each scale value is equal-sized.

9. The method of claim 1, wherein:

when the plurality of first lattice units is displayed in a graphical user interface of the terminal, the first lattice units are visually distinguished from each other based on whether additional advertisement registration is allowed.

10. An apparatus comprising:
one or more network interfaces;
one or more processors; and
a data storage medium storing computer-readable instructions operative to cause the one or more processors to:
receive an access request from a terminal via a communication network, wherein the terminal is one of a computer, a mobile communication device, an internet set top box, or a personal digital assistant;
search a map information database for first map information and transmit at least some of the first map information to the terminal via the communication network in response to the access request, said first map information being associated with first center coordinates and a first scale value and structured into a first lattice having a plurality of first lattice units, a first subset of the first lattice units being designated as allowing additional advertisement registration, a second subset of the first lattice units being designated as disallowing additional advertisement registration;
receive map scaling input from the terminal via the communication network, the map scaling input representing a modification of the first scale value to a second scale value, the second scale value being different than the first scale value and representing a more detailed representation of the electronic map;
search the map information database for second map information and transmit at least some of the second map information to the terminal via the communication network in response to the map scaling input, said second map information being associated with second center coordinates and the second scale value and structured into a second lattice having a plurality of second lattice units, a first subset of the second lattice units being designated as allowing additional advertisement registration, a second subset of the second lattice units being designated as disallowing additional advertisement registration, wherein more than one of the second lattice units corresponds geographically to one of the first lattice units, and whether additional advertisement registration is allowed for at least one of the second lattice units is independent of whether additional advertisement registration is allowed for the first lattice unit to which the at least one of the second lattice units corresponds;
receive an advertisement content registration request from the terminal via the communication network, said advertisement content registration request having advertisement information identifying one or more of the first and second lattice units for which additional advertisement registration is allowed, the advertisement information including advertisement content, wherein the advertisement content is one of text, a symbol, an image, a moving picture, an animation, uniform resource locator (URL), or a combination thereof; and
register in an advertisement database the advertisement information in association with the one or more of the first and second lattice units identified in the advertisement content registration request such that the advertisement content corresponding to the registered advertisement information does not visually overlap with other advertisement content having associated advertisement information registered in the advertisement database when displayed in a graphical user interface in accordance with either of the first or second scale values on a client device in the communication network.

11. The apparatus of claim 10, wherein:
when the plurality of first lattice units is displayed in a graphical user interface of the terminal, the first lattice units are visually distinguished from each other based on whether additional advertisement registration is allowed.

* * * * *